(12) United States Patent
Jansen et al.

(10) Patent No.: US 9,206,921 B1
(45) Date of Patent: Dec. 8, 2015

(54) SEALED SOLENOID AND SOLENOID VALVE

(71) Applicant: Jansen's Aircraft Systems Controls, Inc., Tempe, AZ (US)

(72) Inventors: Harvey B. Jansen, Mesa, AZ (US); David G. Hayward, Scottsdale, AZ (US)

(73) Assignee: JANSEN'S AIRCRAFT SYSTEMS CONTROLS, INC., Tempe, AZ (US)

( * ) Notice: Subject to any disclaimer, the term of this patent is extended or adjusted under 35 U.S.C. 154(b) by 70 days.

(21) Appl. No.: 14/145,820

(22) Filed: Dec. 31, 2013

Related U.S. Application Data

(60) Provisional application No. 61/748,419, filed on Jan. 2, 2013.

(51) Int. Cl.
| | | |
|---|---|---|
| *F16K 31/02* | (2006.01) | |
| *F16K 11/065* | (2006.01) | |
| *F16K 31/06* | (2006.01) | |
| *F16K 31/10* | (2006.01) | |

(52) U.S. Cl.
CPC ......... *F16K 31/0655* (2013.01); *F16K 31/0603* (2013.01); *F16K 31/10* (2013.01); *Y10T 137/8667* (2015.04)

(58) Field of Classification Search
CPC ................ Y10T 137/8667; F16K 31/0603; F16K 31/10
USPC .................. 137/625.25; 251/129.07, 129.16, 251/129.17
See application file for complete search history.

(56) References Cited

U.S. PATENT DOCUMENTS

| | | | |
|---|---|---|---|
| 3,961,644 A | 6/1976 | Eckert | |
| 4,196,751 A | 4/1980 | Fischer et al. | |
| 4,610,425 A | 9/1986 | Kelly | |
| 4,714,234 A * | 12/1987 | Falk et al. | ............... 251/129.17 |
| 5,348,233 A * | 9/1994 | Press et al. | ............... 239/585.3 |
| 5,484,270 A | 1/1996 | Adahan | |
| 5,653,422 A | 8/1997 | Pieloth et al. | |
| 6,131,880 A * | 10/2000 | Hahn et al. | ............... 251/129.16 |
| 6,390,129 B2 | 5/2002 | Jansen et al. | |
| 6,830,231 B2 | 12/2004 | Paessler et al. | |

(Continued)

OTHER PUBLICATIONS

Datasheet for BZ AC Buzzer, Deltrol Controls, 2012 (Retrieved from http://www.deltrol-controls.com/SITES/DEFAULT/FILES/BROCHURES/BZ_DATSHEET_100812_0.PDF on Dec. 27, 2013).

(Continued)

*Primary Examiner* — John K Fristoe, Jr.
*Assistant Examiner* — Kelsey Rohman
(74) *Attorney, Agent, or Firm* — Ingrassia Fisher & Lorenz, P.C.

(57) ABSTRACT

A sealed solenoid provides an improved actuator for valves and other devices, particular such devices used in extreme environments and/or with corrosive media. For example, the improved solenoid construction can be used to drive a precision flow control valve used in air and space applications, such as to control fuel and oxidizer combustion media in rocket and other thrust components. The solenoid is retained in a solenoid retainer to which is attached a rigid barrier that isolates the solenoid pole piece and coil from the media. A clapper disposed outside the barrier from the solenoid serves as the armature, receiving magnetic flux from the solenoid through the barrier without interference from the barrier. The barrier may be extremely thin and magnetically inert.

20 Claims, 8 Drawing Sheets

(56) References Cited

U.S. PATENT DOCUMENTS

| | | | |
|---|---|---|---|
| 7,452,192 B2 * | 11/2008 | Hirota | 417/222.2 |
| 7,726,951 B2 | 6/2010 | Jansen et al. | |
| 7,878,214 B1 | 2/2011 | Jansen et al. | |
| 8,037,869 B2 * | 10/2011 | Ricco et al. | 123/472 |
| 8,066,474 B1 | 11/2011 | Jansen et al. | |
| 8,104,258 B1 | 1/2012 | Jansen et al. | |
| 8,226,359 B1 | 7/2012 | Jansen et al. | |
| 8,303,276 B2 | 11/2012 | Adahan | |
| 8,308,130 B2 * | 11/2012 | Vaz De Azevedo | 251/129.07 |
| 8,573,245 B1 | 11/2013 | Jansen | |
| 2003/0178593 A1 * | 9/2003 | Grytz | 251/129.16 |
| 2011/0049406 A1 * | 3/2011 | Boeland et al. | 251/129.15 |

OTHER PUBLICATIONS

"Proportional Solenoid Valves," Deltrol Controls, 2012 (Retrieved from http://www.deltrol-controls.com/products/solenoid-valves/proportional-valves on Dec. 27, 2013).

Datasheet for DPV1N Proportional Solenoid Valve, Deltrol Controls, 2012 (Retrieved from http://www.deltrol-controls.com/sites/default/files/brochures/DPV1N%20090512.pdf on Dec. 27, 2013).

* cited by examiner

SEALED SOLENOID AND SOLENOID VALVE

CROSS-REFERENCE TO RELATED APPLICATIONS

This application is a non-provisional and claims the benefit of U.S. provisional application No. 61/748,419, filed on Jan. 2, 2013, the entire disclosure of which is incorporated by reference as though fully set forth herein.

STATEMENT OF FEDERALLY SPONSORED RESEARCH OR DEVELOPMENT

Not applicable.

BACKGROUND

The present disclosure relates to a sealed solenoid construction, and more particularly, to a sealed solenoid valve in which the solenoid coil and pole piece are protected from the environment.

Solenoids are known to be useful for directly actuating valves by applying a current to the solenoid coil to induce a magnetic flux through an armature that causes the armature to move. A direct-drive solenoid valve typically actuates a rod-shaped core armature with a proximal end coupled directly to the valve head. It is also known to use a solenoid to actuate a disc-shaped armature, called a "clapper," that can be separated from the solenoid by a small gap, such as in a non-energized state of the solenoid. In one configuration, when the solenoid is energized, the magnetic flux crosses the gap and pulls the clapper toward, and often into contact with, the solenoid. The solenoid may provide the opposite actuation (i.e., the clapper is biased into contact with the solenoid until the solenoid is energized and pushes the clapper away). Such a "clapper valve" can be favorable over other solenoid valve constructions because, for the same size solenoid, a greater magnetic flux can be supported by the clapper surface area than by a rod-shaped armature. The greater magnetic flux results in a greater actuation force. Further, a clapper armature does not need to extend into the interior of the solenoid coil, such that a stationary pole piece can be disposed within the coil (creating a solid-core solenoid) to augment the magnetic flux.

Solenoids, and in particular solenoid coils and pole pieces, can be manufactured from many different conductive and ferromagnetic materials. In a valve that needs to be very small or lightweight, it may be desirable to, for example, choose a lighter ferromagnetic material for the pole piece than the typically-used iron or soft iron. However, it is known in solenoid-operated valves to immerse the solenoid in the working fluid in order to lubricate or protect the components, to provide a path for fluid flow or armature movement, or to facilitate pressure balancing of the valve. Where the coil and/or pole piece materials are chosen for reduced weight, they may be more susceptible to corrosion by the working fluid. In particular, valves for use in some air and space applications (e.g., rocket engines and thrust boosters) may need to be compact, lightweight, and able to control the flow of corrosive gaseous or liquid media, such as hypergolic propellants like monomethyl-hydrazine (MMH) and oxidizers like nitrogen tetroxide (N2O4). It may be unfavorable to immerse the coil and pole piece(s) in corrosive working media because such a valve design may prevent the selection of materials that provide the necessary functional properties but lesser weight, because such lightweight materials may be more susceptible to corrosion.

Solenoid-driven poppet valves can be used in flow control applications where release of a gas from the valve must be controlled accurately. Such valves benefit from being "balanced," wherein all forces acting on the poppet are substantially equal when the solenoid is non-energized, and only a small force is needed to actuate the valve, even when high pressure media is being controlled by the valve. Typically, the balanced state is closed, with a light gauge spring holding the poppet closed. A balanced poppet valve may be actuated by a solenoid, which magnetic force only has to overcome the biasing force of the spring to actuate the valve. The low force demands less power, which allows the solenoid (i.e., the coil, pole piece(s), and housing therefor) to be smaller and lighter.

Ordinary solenoid-driven balanced poppet valves are prone to leakage in high-pressure applications due to the design and materials used. Some such valves exist that overcome the leakage problem at high fluid pressures, and thus may be used in extreme environments and mission-critical applications where the valves must operate rapidly and accurately, exhibit low hysteresis, and provide bubble-tight shut-off. In air and space applications, such valves must further be designed to contribute as little weight as possible to the craft or component in which they are used, and must withstand the extreme conditions of the application, including extremely high fluid pressures (up to 10 kpsi or higher), extreme temperatures and temperature variation (from sub-zero to well above zero), material deformation due to pressure and thermal stresses, and vibrations and stresses due to high speeds of the craft. Existing designs typically either immerse the solenoid in the working media, requiring use of relatively large, heavy corrosion-resistant materials for the solenoid components, or isolate the solenoid and armature from the working media with sealing arrangements that complicate the construction of the valve, particularly when working to meet the stringent operational, weight and form factor requirements of air and space applications.

BRIEF SUMMARY

The disclosure provides a sealed solenoid construction that allows for the use of lightweight materials in the solenoid coil, pole piece(s), and housing. The sealed solenoid constructions may be used in a lightweight solenoid actuator and a pressure-balanced valve that can be used with corrosive media, is capable of withstanding high vibration and shock loads, and is highly accurate with rapid actuation response, making the valve capable of application in aerospace environments, including supersonic and hypersonic flight.

In one aspect, the present disclosure provides a solenoid actuator for a valve having a valve member movable within a housing to control the flow of a working media through an interior of the housing from an inlet port to an outlet port. The actuator may include a wire coil and at least one pole piece made of a magnetically active material, a solenoid retainer configured to couple to the housing and defining an interior space containing the wire coil and the at least one pole piece, a magnetically inert barrier member forming a closed end of the solenoid retainer, and a magnetically active armature separated from the wire coil and the at least one pole piece by the barrier member. The armature may be configured to couple to the valve member to move the valve member when the wire coil is energized and de-energized to control communication between the inlet port and the outlet port. When the solenoid retainer is coupled to the housing, the armature and the barrier member may be in communication with the working media, and the barrier member may seal off the wire coil and the pole piece from the working media.

In another aspect, the present disclosure provides a solenoid valve having a housing defining an inlet port, an outlet port, and a valve chamber receiving working media from the inlet port. The solenoid valve further has a valve member movable within the valve chamber to control the flow of the working media from the inlet port to the outlet port. The solenoid member further has a solenoid actuator coupled to the housing and disposed in communication with the valve chamber. The actuator includes a wire coil and at least one pole piece made of a magnetically active material, a solenoid retainer coupled to the housing and defining an interior space containing the wire coil and the pole piece, a magnetically inert barrier member forming a closed end of the solenoid retainer, and a magnetically active armature separated from the wire coil and the at least one pole piece by the barrier member. The armature may be coupled to the valve member to move the valve member when the wire coil is energized and de-energized to control communication between the inlet port and the outlet port. The armature and the barrier member may be in communication with the working media, and the barrier member may seal off the wire coil and the pole piece from the working media.

In yet another aspect, the present disclosure provides a clapper solenoid valve having a housing defining an inlet port, an outlet port, a valve chamber receiving working media from the inlet port, and an actuator chamber in communication with the valve chamber. The clapper solenoid valve further has a poppet rod movable within the valve chamber to control the flow of the working media from the inlet port to the outlet port, a solenoid disposed within the actuator chamber and including a wire coil and at least one pole piece made of a magnetizable material, a solenoid retainer having a magnetically inert rigid barrier member and defining an interior space containing the solenoid, a clapper armature made of a magnetizable material and separated from the wire coil and the pole piece by the barrier member, and a spring disposed between the clapper and the solenoid retainer to bias the clapper either toward or away from the wire coil and the pole piece. The clapper and the barrier member may be subjected to the working media during operation of the clapper solenoid valve. The clapper may be coupled to the poppet rod to move the poppet rod in response to the wire coil being energized and de-energized to open and close communication between the inlet port and the outlet port.

These and other aspects and advantages of the disclosure will be apparent from the detailed description and drawings. What follows are one or more example embodiments. To assess the full scope of the invention the claims should be looked to, as the example embodiments are not intended as the only embodiments within the scope of the invention.

DETAILED DESCRIPTION

Figure 1:
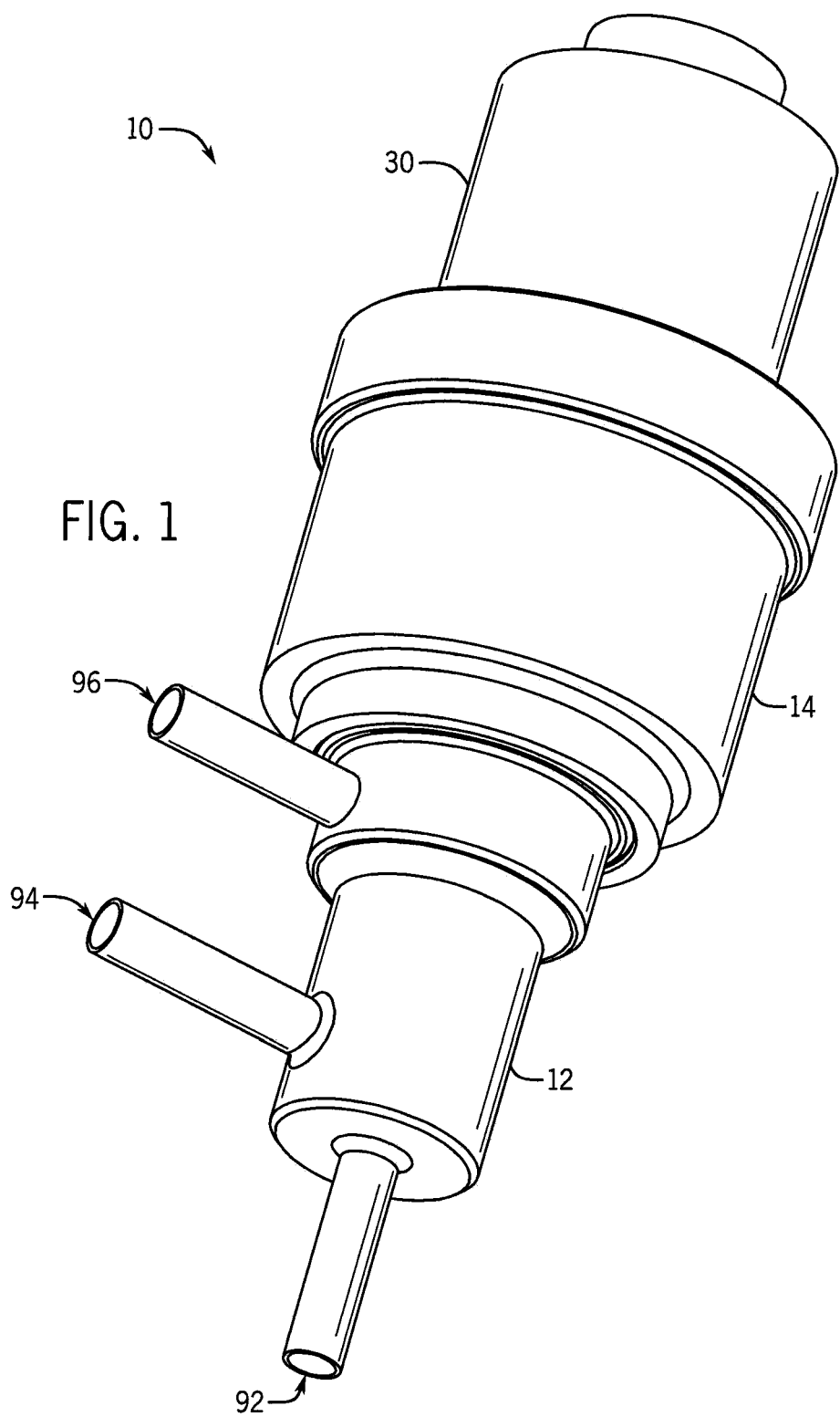
FIG. 1 is a perspective view of an example valve having a sealed solenoid actuator in accordance with the present disclosure and suitable for use in air and space applications.

A solenoid actuator in accordance with the present disclosure includes a solenoid and an armature, where the solenoid may be structurally isolated from the armature by a rigid barrier member disposed between the solenoid and the armature. The barrier member may be magnetically inert and sufficiently thin so as not to interfere with a magnetic flux between the energized solenoid and the armature. The barrier member may further be flat (i.e., having planar opposing sides), and may be contacted by the armature during operation of the actuator. The armature may, in some embodiments, be a hingeless clapper that moves axially toward and away from the solenoid. The clapper may have recessed areas in its contacting surface that reduce or eliminate this unwanted adherence by reducing the surface area of contact.

The barrier member may be attached to or integral with a solenoid retainer that defines an interior space containing all or a portion of the solenoid. The solenoid retainer may interface with a housing of another device, such as a valve, to install the solenoid in the device. Together, the barrier member and solenoid retainer isolate the solenoid from gases and fluids within the device, referred to herein as "working media," that may contact the barrier member during operative or non-operative periods of the actuator. The barrier member, and further the solenoid retainer, may be resistant to corrosion by the working media. For example, the barrier member and solenoid retainer may be stainless steel, and further may be austenitic stainless steel, to resist corrosion by known vehicle fuels. In this manner, the solenoid actuator may be used in a solenoid valve, wherein the clapper attaches to a valve member, such as a poppet, that operates the valve as the solenoid is energized and de-energized, controlling the flow of the working media through the valve. Because the solenoid is isolated from the working media, the components of the solenoid, which may include a wire coil, a bobbin, and at least one pole piece, may contain materials that are not compatible with the working media (i.e., the selected materials may be corroded, weakened, or otherwise damaged by contact with the working media). The clapper may be immersed in the working media to allow for simplified pressure balancing of the valve as described below; in particular, no additional sealing structures need to be provided to keep the clapper dry and still pressure-balance the valve.

In accordance with this disclosure, a lightweight, pressure-balanced, solenoid-operated valve using the above solenoid actuator may be configured to operate in extreme environments associated with travel at very high velocity (e.g., supersonic and hypersonic speeds) and high altitude (e.g., into and beyond Earth's stratosphere). To this end, a valve in accordance with this disclosure minimizes cost and weight and improves efficiency and dependability over previous solutions. The valve is also suitable for operation at velocities below Mach 1, such as reached in conventional aircraft. Additionally, the valve may be used in any suitable application that requires high speed valve operation, zero or near-zero leakage, low weight, and low power consumption, and which further controls the pressurized flow of corrosive working media that may corrode or degrade a lightweight solenoid. The valve may be a two-way valve, wherein opening the valve allows a high-pressure fluid to pass from an inlet port to an outlet port. Such a two-way valve may have application as a fuel flow control for a hypergolic propellant, and may be used in an attitude thruster or similar propulsion device. The valve may be a three-way valve, wherein opening the valve opens a fluid path between the outlet port and a first port, and closing the valve opens a fluid path between the outlet port and a second port. Such a valve is illustrated in the figures and may be used, for example, as a pilot valve as described below.

Looking first to FIG. 1, a three-way valve 10 in accordance with an example embodiment of this disclosure is shown. The valve 10 may attach to any suitable pressurized fluid transfer system, such as to a manifold, as described below. The valve 10 may include a valve housing 12 and a solenoid housing 14 that interfaces with the valve housing 12. The housings 12, 14 may be any suitable corrosion-resistant material, such as stainless steel. In some embodiments, the valve housing 12 and the solenoid housing 14 have complementary mating surfaces that engage each other to attach the solenoid housing 14 to the valve housing 12. In the illustrated embodiment, the housings 12, 14 are threaded to matedly attach the proximal end of the solenoid housing 14 to the distal end of the valve housing 12. As described further below, the solenoid housing 12 houses all or part of a solenoid 30, and the valve housing 14 includes a plurality of ports 92, 94, 96 passing through the valve housing 14 into an interior space, referred to herein as a "valve chamber," defined by the valve housing 14. In other embodiments, the valve housing 12 and solenoid housing 14 may be integrated as a single housing.

Figure 2:
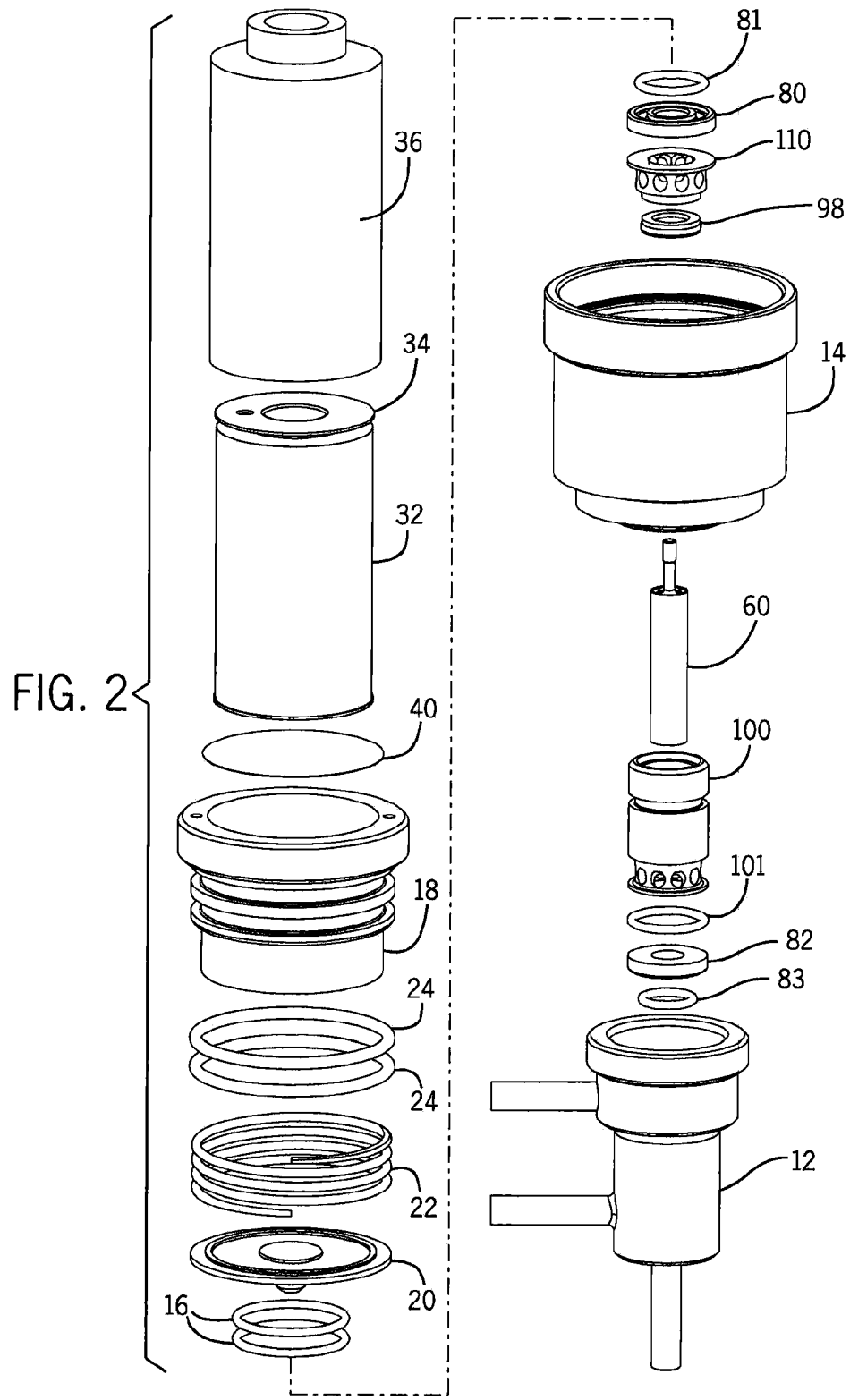
FIG. 2 is an exploded perspective view of the example embodiment of FIG. 1.
Figure 3:
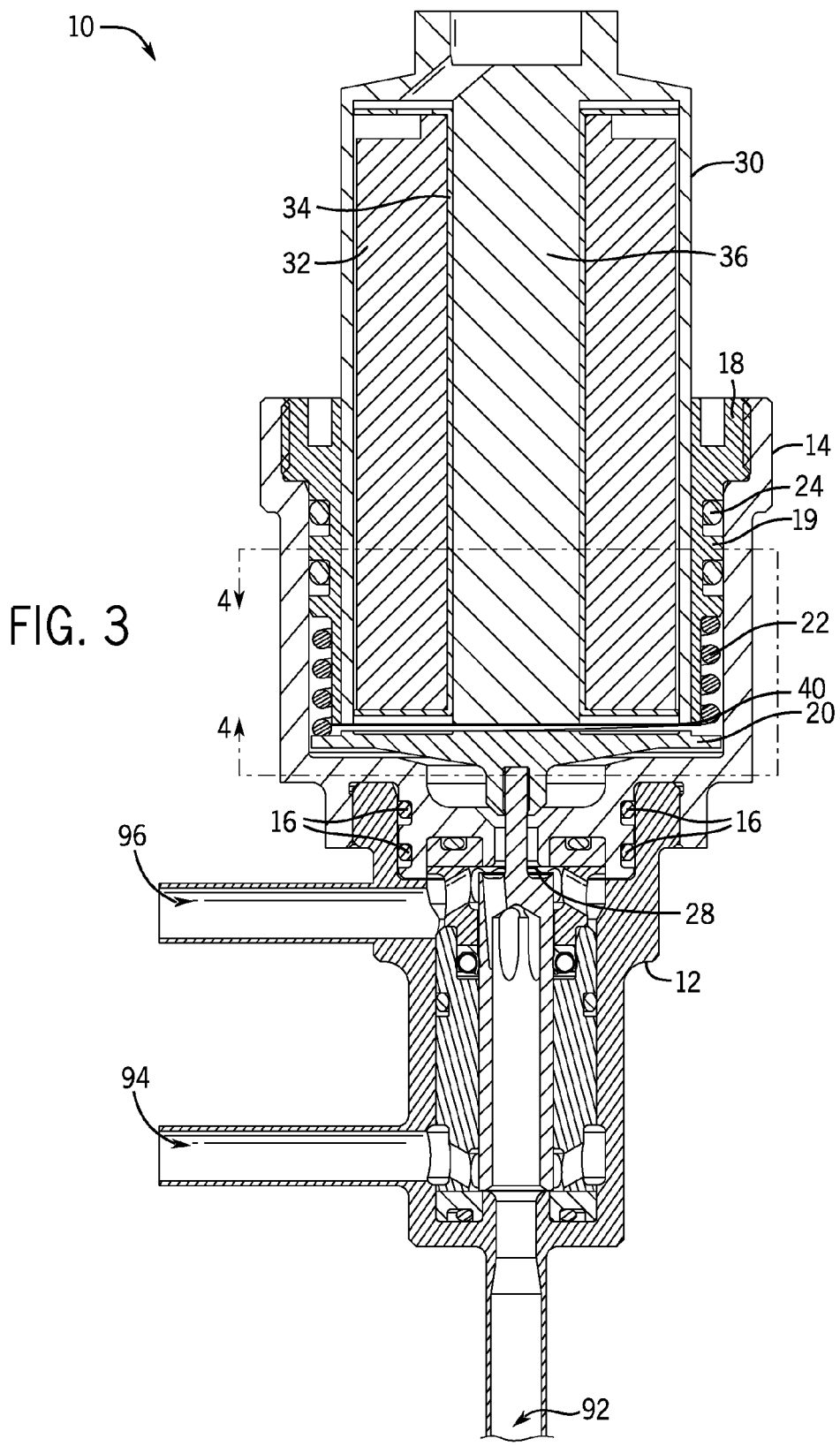
FIG. 3 is a sectional view of the example embodiment of FIG. 1 showing the valve in a closed state.

Referring to FIGS. 2 and 3, one or more o-rings 16 may create a seal between the housings 12, 14. The solenoid housing 14 may be substantially hollow, defining an actuator chamber, and may be open at its distal end to receive a solenoid retainer 18. A coaxial port 28 may be disposed through the proximal end of the solenoid housing 14, providing fluid communication between the chambers of the housings 12, 14. Before the solenoid retainer 18 is installed in the solenoid housing 14, a clapper 20 may be disposed inside the solenoid housing 14 near its proximal end, and a biasing member, such as a clapper spring 22, may be installed distally from and contacting the clapper 20. The clapper spring 22 may fit around the proximal end of the solenoid retainer 18 and abut a flange 19 of the solenoid retainer 18 in order to bias the clapper 20 from the solenoid retainer 18 near the outer edge of the clapper 20. The engagement of the clapper spring 22 with the clapper 20 distally and at the clapper's 20 outer edge, as opposed to proximally or substantially inside the perimeter of the clapper 20, stabilizes the clapper 20 when it is both stationary and operating, and further reduces the tendency of the clapper 20 to tilt, skew, or otherwise rotate other than around its own axis when a magnetic flux is flowing through it.

The solenoid retainer 18 may be installed over the clapper 20 and clapper spring 22, and may be matedly attached to the solenoid housing 14 by interoperation of threaded surfaces or other means. One or more o-rings 24 may form a seal between the solenoid retainer 18 and the solenoid housing 14. The solenoid retainer 18, clapper 20, and clapper spring 22 may all be coaxial with the solenoid housing 14. The solenoid retainer 18, clapper 20, and clapper spring 22 may all be in contact with the working media, and therefore may be made of a corrosion resistant material such as stainless steel. In particular, the clapper 20 may be made of a magnetically active, solenoid-quality stainless steel so that the clapper 20 may serve as a magnetized armature of a solenoid. The mass of the clapper 20 may be minimized to reduce the effects of shock and vibration on the sealing aspects of the valve 10.

The solenoid retainer 18 may define an interior space that contains all or part of a solenoid 30. The solenoid 30 may be any suitable solenoid for actuation the clapper 20 as an armature as described below. In some embodiments, the solenoid 30 may be a solid core solenoid having a wire coil 32 wrapped around a bobbin 34 and a magnetically active pole piece 36 that encircles the wire coil 32, extends over the top (i.e., the distal end) of the wire coil 32, and then extends through the wire coil 32 via the cylindrical interior of the bobbin 34. Due to the isolation of the wire coil 32, bobbin 34, and pole piece 36 from the corrosive working media in the valve 10 as described below, a wide range of lightweight materials may be used for the components of the solenoid 30 without concern for the deleterious impact of the working media on the materials.

Figure 4:
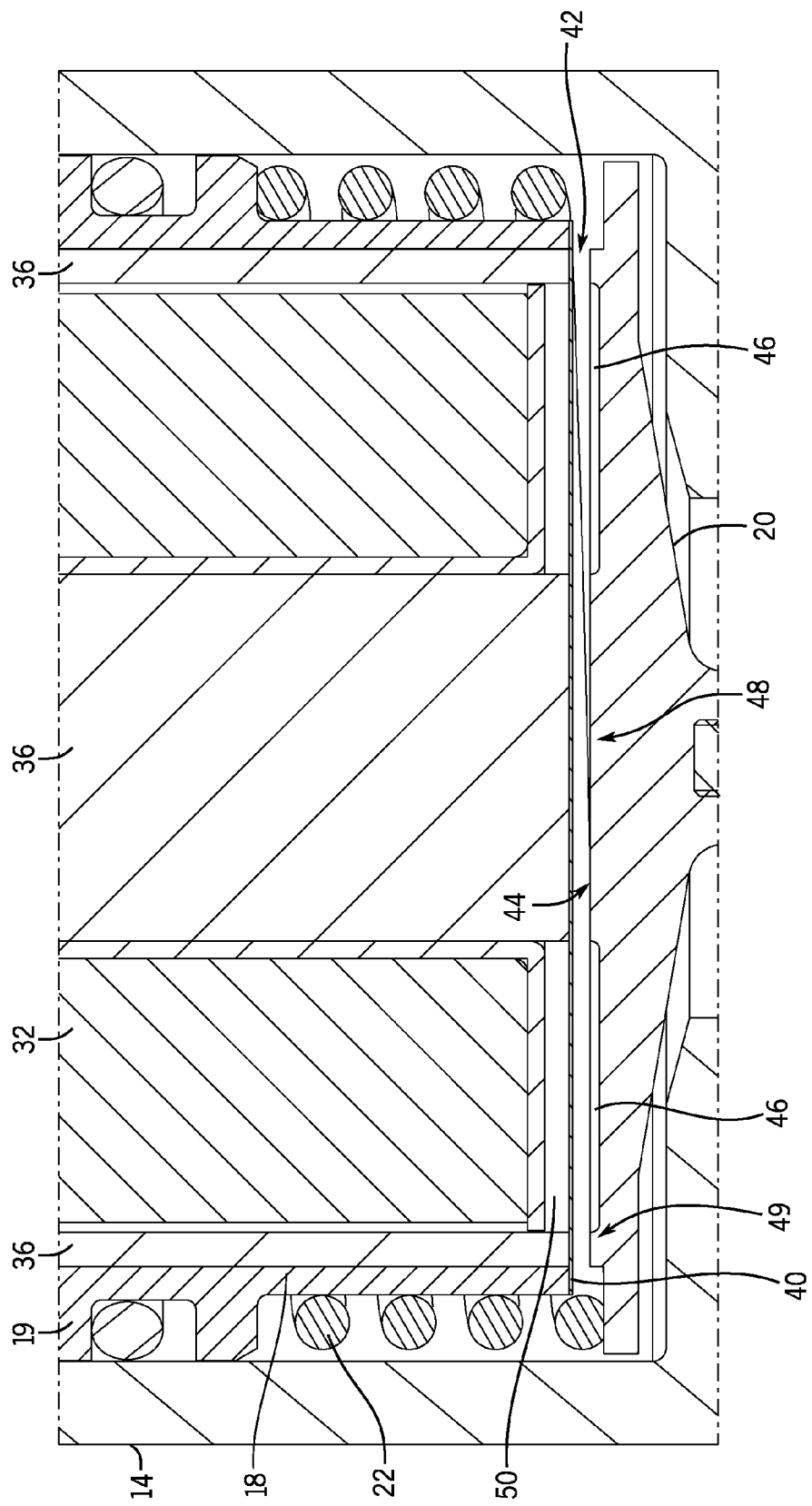
FIG. 4 is a close-up sectional view of area 4-4 of FIG. 3.

As shown in FIG. 3 and in more detail in FIG. 4, the wire coil 32, bobbin 34, and pole piece 36 are isolated from the working media of the valve by a precisely machined flat, thin barrier member 40 attached at the proximal end of the solenoid retainer 18 to create a closed end of the solenoid retainer 18 that seals the solenoid 30 (i.e., the wire coil 32, bobbin 34, and pole piece 36) within the solenoid retainer 18 and isolates the solenoid 30 from the actuator chamber. The barrier member 40 may be entirely magnetically inert so as not to interfere with the magnetic flux of the solenoid 30 and its interaction with the clapper 20. In some embodiments, the barrier member 40 may be an austenitic stainless steel. Furthermore, the barrier member 40 may have the minimum thickness that is still sufficient to isolate the solenoid 30 from the working media, in a range of about 0.005 to 0.1 inches. The minimum thickness further alleviates interference of the barrier member 40 with the magnetic flux of the solenoid 30. The barrier member 40 is rigid and unmoving, and may be a metal plate having planar surfaces that provide a uniform contact surface for the clapper 20. The rigid, stationary, and uniform contact surface allows for precise operation of the clapper 20 and reduces wear on the clapper 20. The barrier member 40 may be the same material as the solenoid retainer 18, and may be permanently attached to the solenoid retainer 18 by welding or other means. The barrier member 40 may be supported along all or a portion of its surface that faces the solenoid 30 by one or more components of the solenoid 30. In some embodiments, the barrier member 40 may contact and be structurally supported by the pole piece 36. This prevents bowing or other deformation of the very thin barrier member 40. A magnetically inert filler 50, such as epoxy, may fill any space between the bobbin 34 and the barrier member 40 to hold the bobbin 34 in place and further support the barrier member 40.

In some embodiments, the clapper 20 may be biased away from the barrier member 40 by the clapper spring 22 when the solenoid 30 is de-energized, leaving a gap 42 of a prescribed dimension that is accounted for in the valve 10 stroke length design. The gap 42 may be significantly wider than the barrier member 40 is thick, such that the barrier member 40 accounts for a small percentage, such as 15%-20%, of the distance between the clapper 20 and the solenoid 30. That is, the gap 42 may be at least five times the thickness of the barrier member 40. The gap 42 between the barrier member 40 and the clapper 20 may be present at all times, except at the end of the valve stroke as follows: when the solenoid 30 is energized, it creates a magnetic flux through the pole piece 36 that crosses the barrier member 40 and the gap 42 and pulls the clapper 20 into contact with the barrier member 40 while compressing the clapper spring 22. In other embodiments, the clapper 20 may be biased against the barrier member 40 when the solenoid 30 is de-energized, and energizing the solenoid 30 pushes the clapper 20 away from the barrier member 40 to create the gap 42 as described above.

The clapper 20 has a contact face 44 that is parallel to and may contact or otherwise move into physical abutting relation with the barrier member 40 when the solenoid is energized.

However, the contacting surfaces of the barrier member 40 and clapper 20 may be so precisely machined that wringing (also known as the Jo block effect) occurs. That is, the clapper 20 may adhere to the barrier member 40 at the contacting surfaces. When the solenoid 30 is de-energized, at worst the clapper 20 and barrier member 40 may remain adhered together, sticking the valve 10 closed. In a less extreme case, the clapper spring 22 applies sufficient force to the clapper 20 to overcome the Jo block effect and push the clapper 20 to its open position, but the wringing adds several milliseconds or more to the valve 10 operation.

Figure 5:
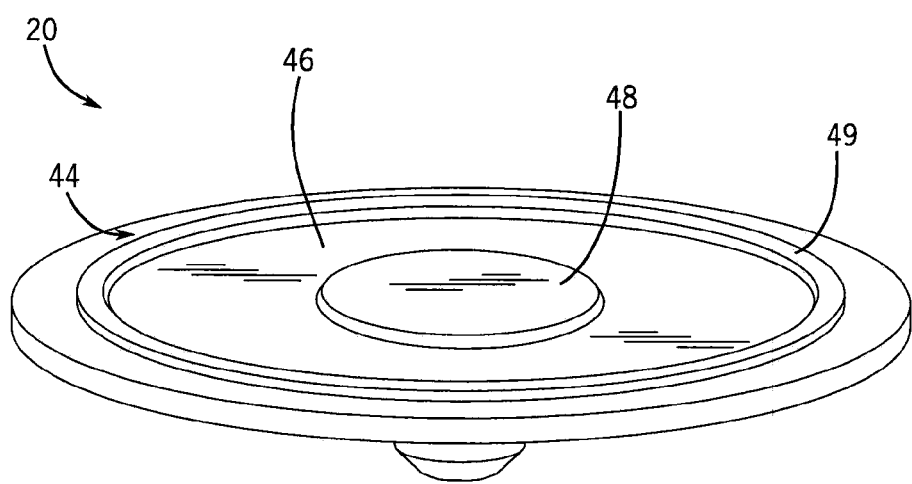
FIG. 5 is a top perspective view of an embodiment of a clapper armature used in the example embodiment of FIG. 1.

To overcome the Jo block effect between the clapper 20 and the barrier member 40, the contact face 44 of the clapper 20 may have one or more recessed areas 46 at the contact face 44. See FIG. 5. The recessed areas 46 may be undercuts formed by removing a thin layer of material from the contact face 44. Undercutting prevents contact of the contact face 44 with the barrier member 40 in the recessed areas 46, which reduces and may eliminate wringing between the clapper 20 and the barrier member 40. In the illustrated embodiment, the recessed area 46 is disposed between an inner disc 48 and an outer ring 49 of the contact face 44 that will still contact the barrier member 40 across from the inner and outer portions, respectively, of the pole piece 36 to facilitate the magnetic flux through the clapper 20.

Figure 6:
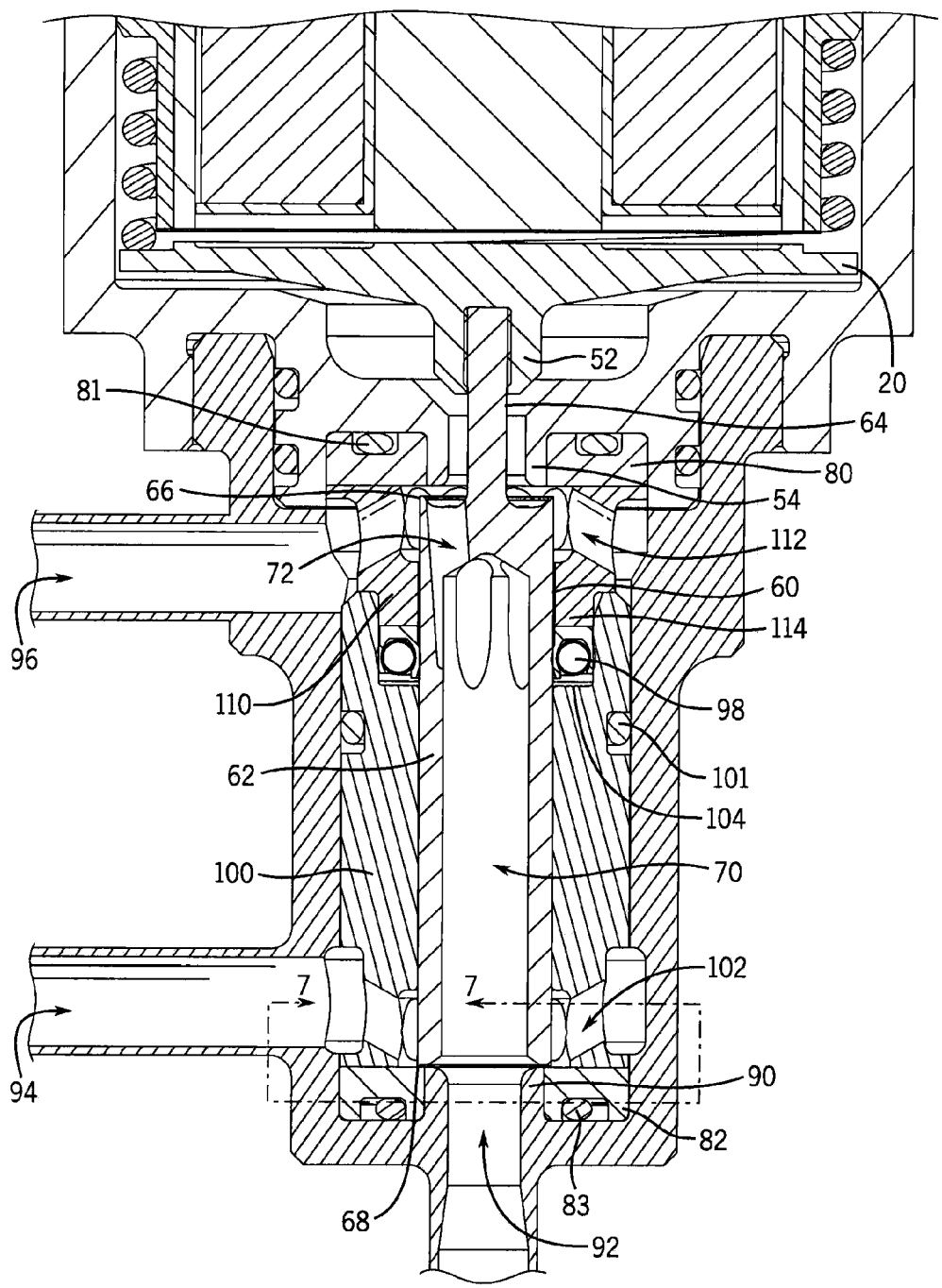
FIG. 6 is an enlarged sectional view of the valve of FIG. 3 in a closed state.

Referring to FIG. 6, the clapper 20 may have a valve mount 52 that aligns with the coaxial port 28 at the proximal end of the solenoid housing 14. The coaxial port 28 may receive an attachment arm 64 of a poppet rod 60. The attachment arm 64 may have a threaded end that mates with a threaded recess in the valve mount 52 of the clapper 20 to attach the poppet rod 60 to the clapper 20. The poppet rod 60 may have a cylindrical, substantially hollow poppet body 62 made of a non-corrosive material, such as stainless steel. The mass of the poppet rod 60 may be minimized to reduce the effects of shock and vibration on the sealing aspects of the valve 10.

The poppet body 62 may have opposite-facing sealing edges 66, 68 at opposing ends of the poppet body 62. That is, a distal sealing edge 66 at the distal end of the poppet body 62 may project distally from the poppet body 62 and contact a distal seat 80, and a proximal sealing edge 68 at the proximal end of the poppet body 62 may project proximally from the poppet body 62 and contact a proximal seat 82. The poppet body 62 may define an internal flow passage 70 that opens out of the proximal end of the poppet body 62 inside the perimeter of the proximal sealing edge 68. A channel 72 may be disposed in the poppet body 62 and may extend from the distal end of the poppet body 62, inside the perimeter of the distal sealing edge 66, to the flow passage 70. The flow passage 70 and channel 72 together form a fluid flow path through the length of the poppet body 62.

The distal seat 80 may be disposed in a recess at the proximal end of the solenoid housing 14, surrounding a bulkhead 54 of the coaxial port 28. The distal seat 80 may receive a distal o-ring 81 that prevents media leakage past the distal seat 80. The proximal seat 82 may be disposed in a recess at the proximal end of the valve chamber, between the inner surface of the valve housing 12 and the outlet port bulkhead 90. The proximal seat 82 may receive a proximal seat o-ring 83 that prevents media leakage past the proximal seat 82. The seats 80, 82 may be annular members and may be made of an at least partially deformable polymer that is compatible with the media used in the valve 10, and may further be compatible with any media used in associated systems. The polymer may be a plastic, particularly a thermoplastic. The polymer may be a polytetrafluoroethylene (PTFE) material, such as TEFLON by DuPont Co. The PTFE may have a very high purity, up to 100% or "virgin grade." However, while virgin PTFE has improved chemical and thermal resistance properties over "mechanical grade" PTFE, which may contain additives, virgin PTFE has a tendency to cold-flow. In a critical application where virgin PTFE is preferred, the seats 80, 82 may be held in place by the valve 10 components as described herein. The polymer may alternatively be a polychlorotrifluoroethylene (PCTFE) material, which exhibits less creep than PTFE but is also stiffer. The seat 80, 82 material should be pliant enough to allow the corresponding sealing edges 66, 68 to sink into the seat 80, 82 and create the necessary bubble-tight seal.

Figure 7:
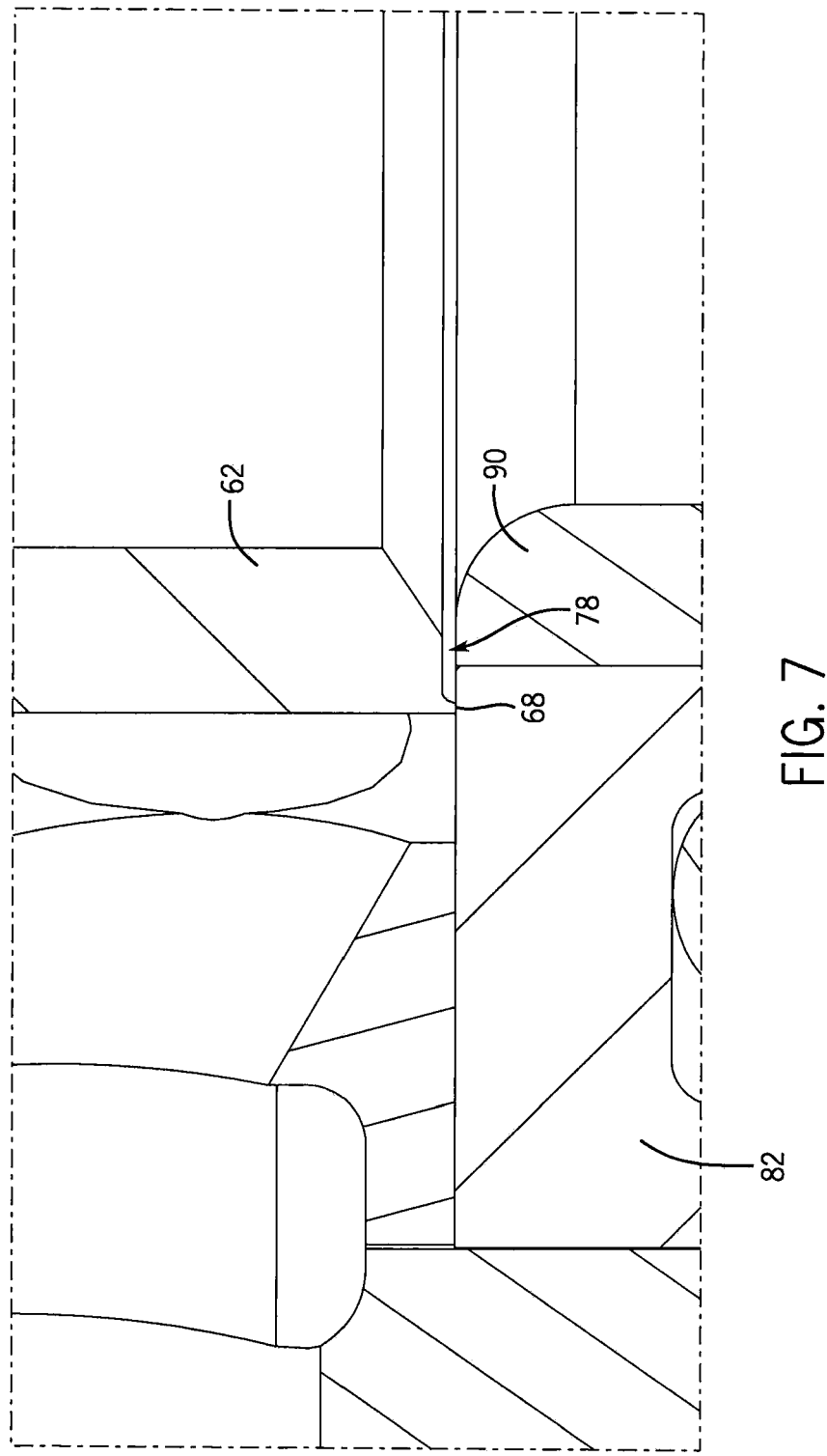
FIG. 7 is a close-up sectional view of area 7-7 of FIG. 6.

The sealing edges 66, 68 may each be a knife edge, which is a ring of poppet material that tapers down to a minimum width that allows the knife edge to closely interface with the corresponding seat 80, 82 and form a bubble-tight seal. The minimum width of the knife edge may be about 0.002 inches. The depth to which each sealing edge 66, 68 sinks into its respective seat 80, 82 may depend on the minimum knife edge width and on the seat 80, 82 material hardness. As shown in FIG. 7, the maximum depth of the sealing edge 66, 68 penetration may additionally or alternatively be controlled to a predetermined compression by an adjacent stop surface, such as the proximal stop surface 78 (or a corresponding distal stop surface), that is the external surface of the poppet body 62 inside the associated sealing edge. The sealing edge 66, 68 can only compress the seat 80, 82 until the stop surface engages a metal surface (e.g., a metal surface 90 contacted by the proximal stop surface 78) and can move no further. This limit protects the seats 80, 82, particularly the proximal seat 82, from becoming over-stressed at high spring loads. This allows higher preloading of the clapper spring 22, which in turn allows for better sealing capability at high vibration and shock levels.

Returning to FIG. 6, the valve housing 12 may have a valve chamber in which the poppet rod 60 is centrally disposed. One or more ports may be disposed through the wall of the valve housing 12 into the valve chamber, such as in the illustrated example configuration. An outlet port 92 may be disposed through the proximal end of the valve housing 12, and may be surrounded by the outlet port bulkhead 90. A proximal port 94 may be disposed through the valve housing 12 near the proximal end, and a distal port 96 may be disposed through the valve housing 12 near the distal end. In some embodiments, both the proximal port 94 and the distal port 96 may be inlet ports that deliver a working media to the valve under pressure. The same or different working media may be delivered to the valve 10 at the same or different pressures, and the media may fill the voids within the chambers of the housings 12, 14 and then be released through the outlet port 92 depending on the position of the poppet rod 60. In other embodiments, and as described further below, the proximal port 94 may be an inlet port delivering a highly pressurized working media to the valve 10, and the distal port 96 may be a vent that relieves the pressure in the valve depending on the position of the poppet rod 60.

One or more rod guides 100, 110 may be disposed in the valve chamber. The rod guides 100, 110 will be in contact with the working media and therefore may be an anti-corrosive material, such as stainless steel. The rod guides 100, 110 may be precisely machined to abut both the inner surface of the valve housing 12 and the outer surface of the poppet body 62 of the poppet rod 60, in order to secure the poppet rod 60 coaxially with the clapper 20. The rod guides 100, 110 may further define media chambers 102, 112 in communication with the ports 94, 96 and adjacent to the sealing edges 66, 68 of the poppet rod 60. The rod guides 100, 110 may further abut the seats 80, 82 to hold the seats 80, 82 in place. Finally, the rod guides 100, 110 may support a dynamic seal 98 with the poppet rod 60. The dynamic seal 98 may prevent leakage of media between the ports 94, 96 and may stabilize the moving components of the valve 10 (i.e., the poppet rod 60 and clapper 20) while the valve 10 is subjected to vibration. Furthermore, the dynamic seal 98, together with the seals formed by the sealing edges 66, 68 and the seats 80, 82, may provide pressure balancing of the poppet rod 60 by all having essentially identical effective surface areas. Thus, the poppet rod 60 is entirely pressure balanced throughout the entire stroke and is essentially unaffected by pressure in any of the fluid paths. The pressure balancing allows for significant reductions in the size of the valve 10, as well as significantly increases the efficiency of the valve 10.

The proximal rod guide 100 may abut the proximal seat 82 along the portion of the proximal seat's 82 proximal surface that is outside of the ring where the proximal sealing edge 68 contacts the proximal seat 82. The proximal rod guide 100 may extend from the proximal seat 82, across the proximal port 94, distally to the distal port 96. A guide o-ring 101 may prevent media leakage between the proximal rod guide 100 and the valve housing 12. A proximal media chamber 102 may be disposed within the proximal rod guide 100 near its proximal end. Specifically, the proximal media chamber 102 may extend from the proximal port 94 through the proximal end of the proximal rod guide 100, leaving a substantially cylindrical space that is in fluid communication with the outlet port 92 and receives the proximal end of the poppet rod 60. A seal recess 104 disposed in the distal end of the proximal rod guide 100 may retain the dynamic seal 98 between the proximal rod guide 100 and the poppet rod 60. The dynamic seal 98 may be any suitable dynamic sealing mechanism, such as an o-ring supported by additional seat material.

The distal rod guide 110 may abut the distal seat 80 along the portion of the distal seat's 80 distal surface that is outside of the ring where the distal sealing edge 66 contacts the distal seat 80. The distal rod guide 110 may contact an inner surface of the solenoid housing 14, and may extend from the distal seat 80, proximally across the distal port 96 and into abutment with the proximal rod guide 100. A neck 114 of the distal rod guide 110 may extend into the seal recess 104 of the proximal rod guide 100 and abut the dynamic seal 98. A distal media chamber 112 may be disposed within the distal rod guide 110, extending from the distal port 96 through the distal end of the distal rod guide 110, leaving a substantially cylindrical space that is in fluid communication with the coaxial port 28 and receives the distal end of the poppet rod 60.

When the solenoid 30 is de-energized, the poppet rod 60 thus is normally closed against the proximal seat 82 and open away from the distal seat 80 due to the clapper spring 22 pressing "down" (i.e., in the proximal direction) on the clapper 20 and the attached poppet rod 60. See FIG. 6. In this "closed" position, the proximal media chamber 102 is sealed off from the outlet port 92 by the proximal sealing edge's 68 penetration into the proximal seat 82, and the distal media chamber 112 is open across the distal sealing edge 66. With respect to the flow path of pressurized media in the valve 10, in this "normally closed" position, the media delivered through the proximal port 94 pressurizes the proximal media chamber 102 around the proximal sealing edge 68, while the outlet port 92 is open to vent through the distal port 96. Thus, any pressure in the valve 10 is relieved. If the valve 10 is a pilot valve for a device attached to the outlet port 92, the pressure relief may actuate that device.

Figure 8:
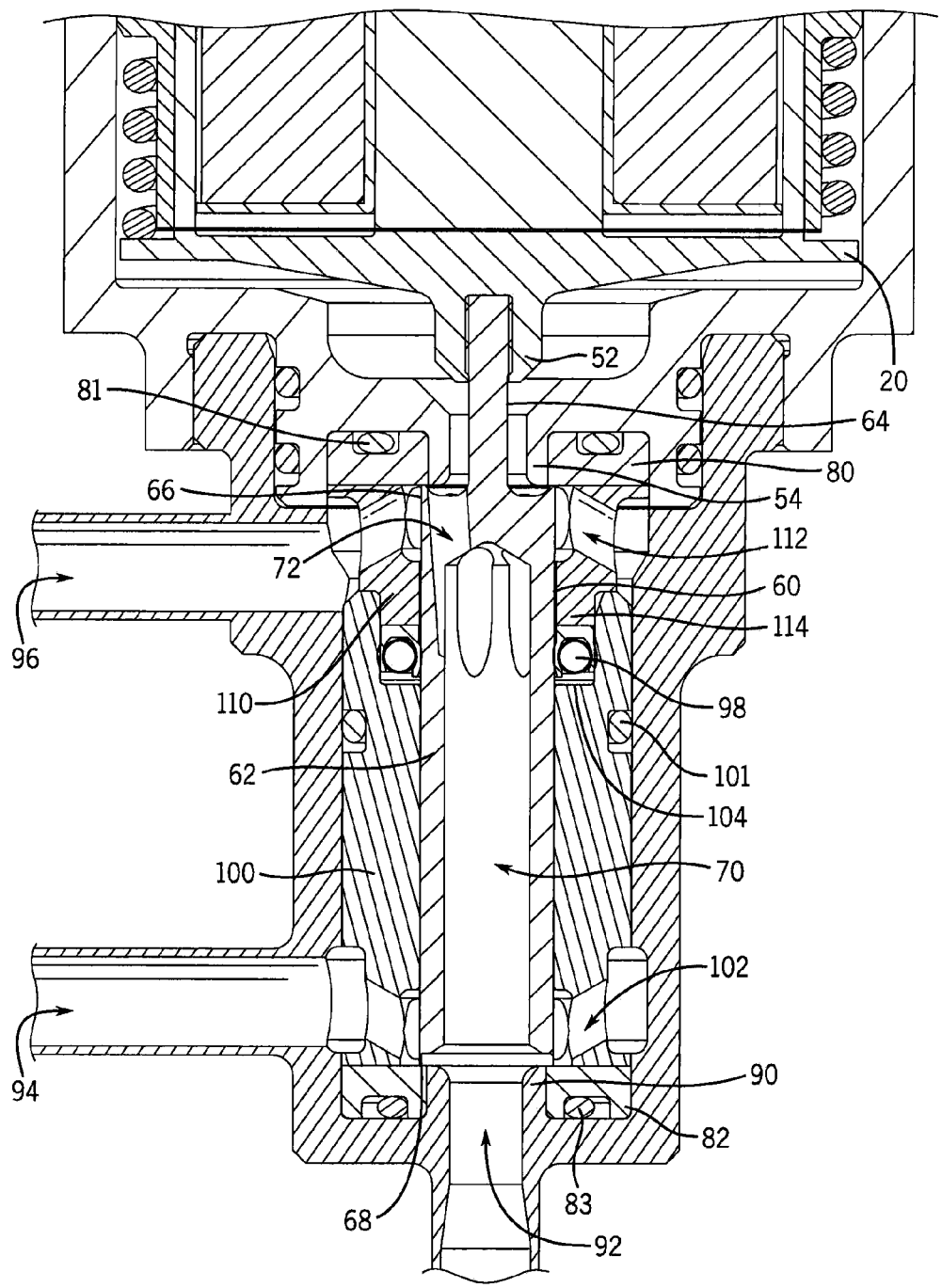
FIG. 8 is an enlarged sectional view as in FIG. 6, showing the valve in an open state.

When the solenoid 30 is energized, the magnetic flux overcomes the biasing force of the clapper spring 22 and the clapper 20 is pulled into contact or near-contact with the barrier member 40, in turn pulling "up" (i.e., in the distal direction) the poppet rod 60 to seal the distal sealing edge 66 against the distal seat 80 and open the proximal sealing edge 68 away from the proximal seal 82. See FIG. 8. In this "open" position, the distal media chamber 112 is sealed off from the outlet port 92 by the distal sealing edge's 66 penetration into the distal seat 80, and the proximal media chamber 102 is open across the proximal sealing edge 68. With respect to the flow path of pressurized media in the valve 10, in this "open" position, the pressurized media delivered through the proximal port 94 may travel into the proximal media chamber 102, across the proximal sealing edge 68, and up through the poppet rod 60 into the distal housing 12, pressurizing the valve 10 before traveling out of the outlet port 92. De-energizing the solenoid 30 causes the clapper 20 to drop out to the normally closed position without adhering to the barrier member 40.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A solenoid actuator for a valve having a valve member movable within a housing to control the flow of a working media through an interior of the housing from an inlet port to an outlet port, the actuator comprising:
   a wire coil and at least one pole piece made of a magnetically active material;
   a solenoid retainer configured to couple to the housing and defining an interior space containing the wire coil and the at least one pole piece;
   a magnetically inert barrier member forming a closed end of the solenoid retainer; and
   a magnetically active armature separated from the wire coil and the at least one pole piece by the barrier member, the armature being configured to couple to the valve member to move the valve member when the wire coil is energized and de-energized to control communication between the inlet port and the outlet port;
   wherein, when the solenoid retainer is coupled to the housing, the solenoid retainer, the armature and the barrier member are in communication with the working media and the barrier member seals off the wire coil and the at least one pole piece from the working media.

2. The actuator of claim 1, wherein the barrier member is a rigid, metal plate coupled to the solenoid retainer.

3. The actuator of claim 2, wherein the armature is separated from the barrier member by a gap when the wire coil is de-energized.

4. The actuator of claim 3, wherein the barrier member has a thickness that is less than the distance across the gap between the armature and the barrier, and wherein the gap is at least five times the thickness of the barrier member.

5. The actuator of claim 3, wherein the barrier member is a non-magnetic stainless steel.

6. The actuator of claim 1, wherein the barrier member is disposed in contact with the at least one pole piece.

7. The actuator of claim 1, wherein the armature is a clapper having a disk shaped contact face disposed in physical abutting relation with the barrier member when the wire coil is energized.

8. The actuator of claim 7, wherein the contact face has at least one recessed area that does not contact the barrier member when the wire coil is energized.

9. The actuator of claim 8, wherein the contact face of the clapper has at least one raised ring defined at least in part by the recessed area, the ring disposed in physical abutting relation with the barrier member when the wire coil is energized.

10. The actuator of claim 7, further including a biasing member coupled to the clapper to bias the clapper toward or away from the wire coil and the at least one pole piece, the biasing member being a spring disposed in contact with an outer periphery of the clapper.

11. The actuator of claim 7, wherein the clapper has a valve mount opposite the contact face configured to directly couple with the valve member.

12. A solenoid valve, comprising:
a housing defining an inlet port, an outlet port, a valve chamber receiving working media from the inlet port, and an actuator chamber;
a valve member movable within the valve chamber to control the flow of the working media from the inlet port to the outlet port; and
a solenoid actuator coupled to the housing and at least in part disposed in the actuator chamber in communication with the valve chamber, the actuator including:
a solenoid having a wire coil and at least one pole piece made of a magnetically active material;
a solenoid retainer coupled to the housing between the solenoid and the housing and defining an interior space containing the solenoid;
a magnetically inert barrier member forming a closed end of the solenoid retainer; and
a magnetically active armature separated from the solenoid by the barrier member, the armature being coupled to the valve member to move the valve member when the wire coil is energized and de-energized to control communication between the inlet port and the outlet port;
wherein the solenoid retainer, the armature and the barrier member are in communication with the working media and the barrier member seals off the wire coil and the at least one pole piece from the working media.

13. The solenoid valve of claim 12, wherein the armature is disposed in the housing such that the armature is immersed in the working media during an operation of the solenoid valve.

14. The solenoid valve of claim 12, wherein the barrier member is a rigid, thin metal plate coupled to the solenoid retainer.

15. The solenoid valve of claim 12, wherein the armature is a clapper having a disk shaped contact face disposed in physical abutting relation with the barrier member when the wire coil is energized.

16. The solenoid valve of claim 12, wherein the housing further defines a vent, and wherein moving the valve member when the wire coil is energized and de-energized further controls communication between the outlet port and the vent.

17. The solenoid valve of claim 12, wherein the valve member is a pressure-balanced poppet rod.

18. A clapper solenoid valve, comprising:
a housing defining an inlet port, an outlet port, a valve chamber receiving working media from the inlet port, and an actuator chamber in communication with the valve chamber and the working media;
a poppet rod movable within the valve chamber to control the flow of the working media from the inlet port to the outlet port;
a solenoid disposed within the actuator chamber, the solenoid including a wire coil and at least one pole piece made of a magnetizable material;
a solenoid retainer disposed between the housing and the solenoid and defining an interior space containing the solenoid, the solenoid retainer having a magnetically inert rigid barrier member;
a clapper armature made of a magnetizable material and separated from the wire coil and the at least one pole piece by the barrier member; and
a spring disposed between the clapper and the solenoid retainer to bias the clapper either toward or away from the wire coil and the at least one pole piece;
wherein the solenoid retainer, the clapper and the barrier member are subjected to the working media during operation of the clapper solenoid valve, and wherein the clapper is coupled to the poppet rod to move the poppet rod in response to the wire coil being energized and de-energized to open and close communication between the inlet port and the outlet port.

19. The clapper solenoid valve of claim 18, wherein the housing further defines a vent, and wherein moving the valve member when the wire coil is energized and de-energized further controls communication between the outlet port and the vent.

20. The clapper solenoid valve of claim 18, wherein the poppet rod is pressure-balanced.

* * * * *